March 25, 1930.   C. G. HALE   1,751,478
AUTOMOBILE AWNING
Filed Oct. 31, 1927   2 Sheets-Sheet 1

Inventor:
Cecil G. Hale,
by Rispey & Kingsland
His Attorneys

March 25, 1930.         C. G. HALE         1,751,478
AUTOMOBILE AWNING
Filed Oct. 31, 1927     2 Sheets-Sheet 2
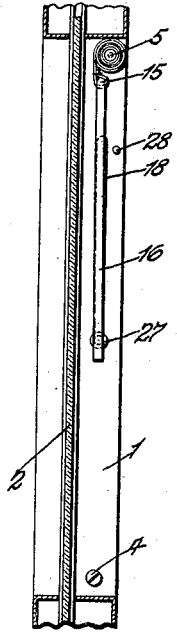
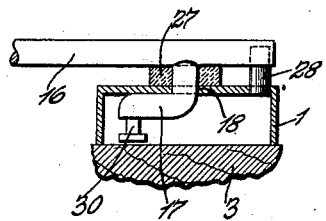
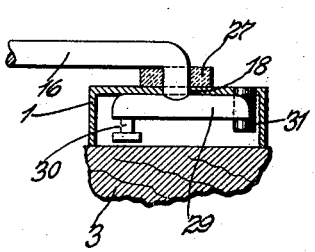
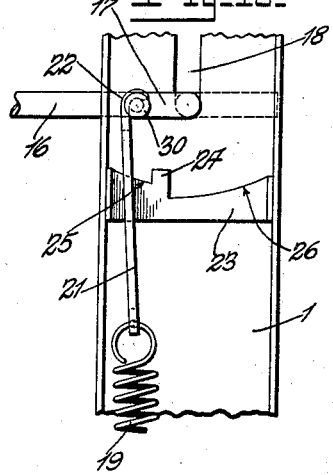
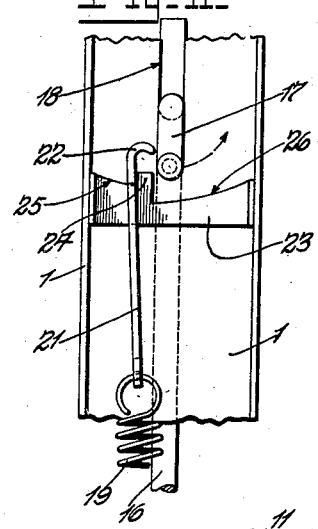
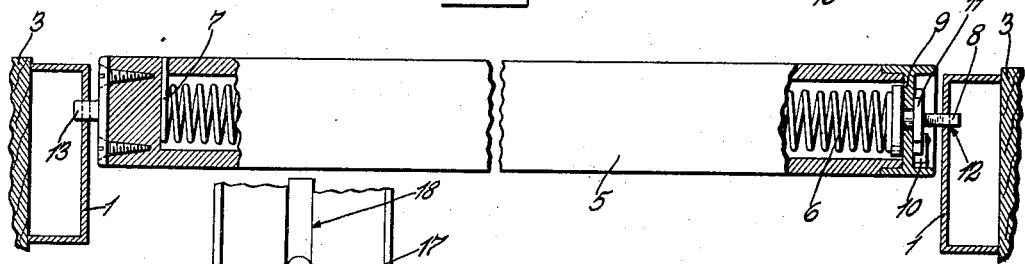
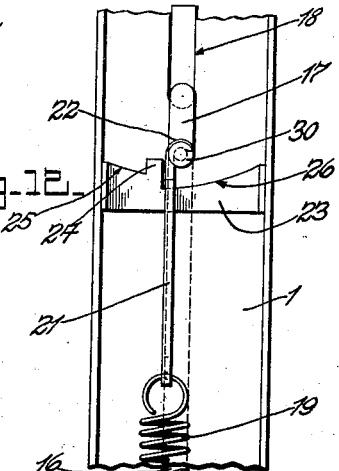
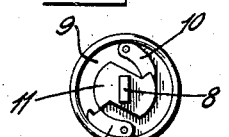
Inventor:
Cecil G. Hale,
by Kippey & Kingsland.
His Attorneys Patented Mar. 25, 1930

1,751,478

UNITED STATES PATENT OFFICE

CECIL G. HALE, OF ST. LOUIS, MISSOURI

AUTOMOBILE AWNING

Application filed October 31, 1927. Serial No. 229,850.

This invention relates to automobile awnings.

An object of the invention is to provide an awning designed and adapted to be applied in connection with the windows and doors of automobiles and capable of adjustment in various positions to function as an awning when the glass panel of the window or door is open or partly open, or as a curtain or shade whether the panel be open or closed.

Another object of the invention is to provide an improved awning device capable of adjustment in various positions with respect to the structure to which it is applied and controlled by opposing springs whereby the awning is retained securely in its proper adjustment.

Other objects will appear from the following description, reference being made to the drawings in which Fig. 1 is a side elevation of the device applied to an automobile.

Fig. 2 is a vertical sectional view of the window or door having the glass panel partly open, one adjustment of the awning being shown in solid lines and the other adjustments in broken lines.

Fig. 3 is a similar sectional view with the glass panel closed and the awning adjusted for use as a shade.

Fig. 4 is a sectional view of one of the panel guides forming a part of the invention and showing the awning adjusted in extended inclined position in solid lines and in a raised inclined position in broken lines.

Fig. 5 is a cross sectional view of one of the panel guides and showing the spring connection with the awning frame.

Fig. 6 is a sectional view on the line 6—6 of Fig. 5.

Fig. 7 is a sectional view of the door or window showing the awning rolled on its roller when not in use.

Fig. 8 is a cross sectional view on the line 8—8 of Fig. 2.

Fig. 9 is a cross sectional view on the line 9—9 of Fig. 4 showing a modified form of a part of the invention.

Fig. 10 is an enlarged view showing the connection of one of the springs with the awning frame on the inside of the panel guide.

Fig. 11 is a view showing the panel frame passing from connection with the tensioning spring link, leaving the latter engaged at one side of the retainer therefor.

Fig. 12 is a view showing the relationship of the spring link and the awning frame when the awning is extended for use as a shade, as in Fig. 3.

Fig. 13 is a view with the parts in section showing the spring roller for the awning and its mounting in connection with the panel guides.

Fig. 14 is an end elevation of the roller showing the latch device for holding the roller in opposition to its spring.

Figure 1:
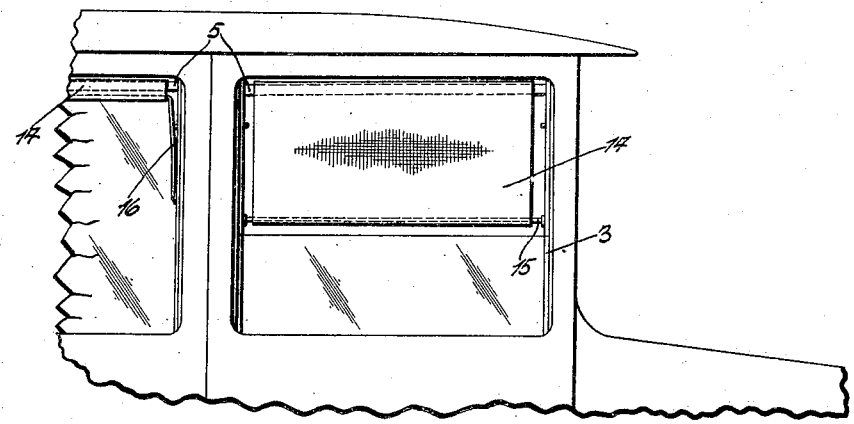
Figure 1:
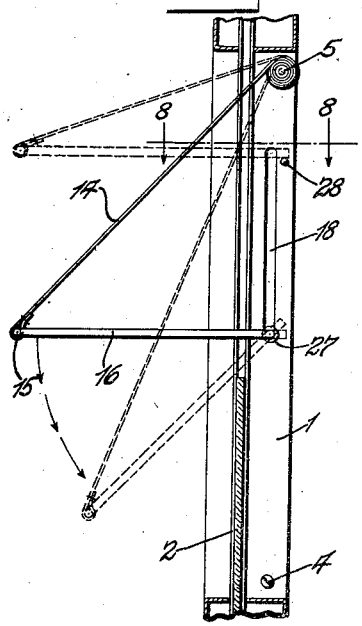
Figure 1:
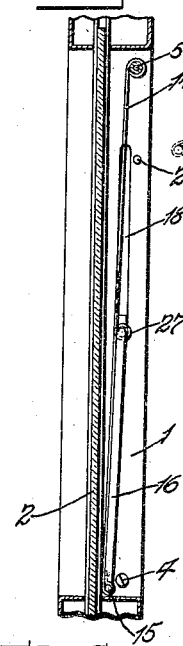
Figure 1:
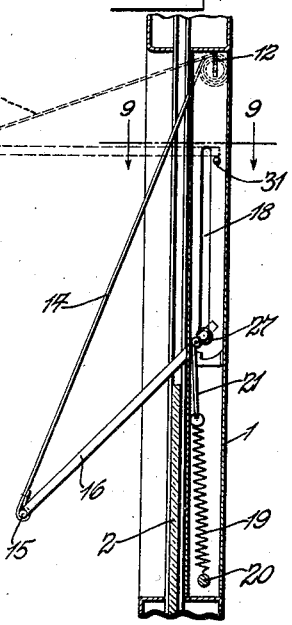
Figure 1:
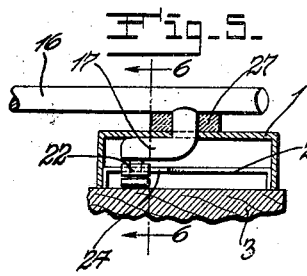
Figure 1:
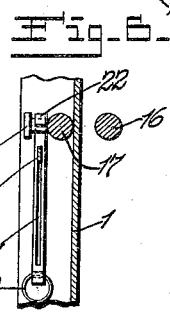

This device is designed and adapted for use in connection with doors or windows having sliding glass panels and may be used with equal satisfaction irrespective of whether the glass panels are capable of movement all the way down or are capable of movement only to a limited extent. The device may also be used satisfactorily irrespective of the shape of the lower part of the panel frame and further may be used satisfactorily as a shade whether the panel is capable of any movement from closed position.

The invention as shown comprises two guides 1 composed of sheet metal made of such shape and dimensions as to displace two of the usual panel guides in an automobile window or door so as to hold and guide the panels 2 with the same degree of satisfaction and efficiency as the panel guides displaced by these guides. The edges of the side flanges of the guides 1 abut against the surface of the door or window frame 3 so as to form an enclosed case that will be readily understood by reference to Figs. 5, 8 and 9. Each guide is secured in position by a pair of screws 4, one near the lower end and one near the upper end of each guide.

The upper end of each pair of guide supports a hollow roller 5 enclosing a strong coiled spring 6. The end 7 of the spring is attached to the roller (Fig. 13) while the opposite end of the spring is attached to a supporting trunnion 8 in a familiar manner.

The trunnion 8 extends through an end cap 9 which is rigid on the end of the roller and which, together with the roller, rotates about the trunnion 8 as an axis. Latch dogs 10 pivotally supported within the end cap 9 releasably engage a part 11 rigid on the trunnion 8 to hold the roller in any position to which it is turned by operation of the spring 6, as is usual and well known in the case of shade rollers. The outer end of the trunnion 8 is flattened (Fig. 14) and is engaged in a slot 12 in the wall of one of the guides 1 so as to hold the trunnion from turning and maintain the spring 6 under tension at all times. To the opposite end of the roller a trunnion 13 is rigidly secured, the same being in axial alinement with the trunnion 8 and mounted in a bearing or holder in the opposite guide 1.

One end of the shade 14 is attached to the roller 5, said roller being turned in a direction by the power of the spring 6 to roll the shade thereon and being turned in the opposite direction by drawing the shade or awning from the roller in the familiar manner of operating a window shade.

An awning frame is secured to the end of the shade or awning 14 opposite from the roller 5. This awning frame comprises a rod bent to provide an intermediate portion 15 extending the full width of the shade and secured thereto and to provide a pair of side arms 16, the ends of which extend between the guides 1. A crank 17 is secured to each of the side arms 16 of the awning frame and operatively extend through vertical slots 18 in the walls of the guides 1. These cranks 17 extend angularly from the side arms 16 through the slots 18 and thence approximately parallel with said arms toward the cross portion 15 of the awning frame.

In each of the guides 1 a spring 19 is mounted having their lower ends attached to studs 20 (Fig. 4) and their upper ends connected with links 21. Each link 21 has a curved hook 22 formed on its upper end for releasable engagement wtih the corresponding crank 17. The combined power or tension of the two springs 19 is less than the power or tension of the spring 6 so that the spring 6 will operate to widen the shade or awning on the roller 5 whenever permitted to do so by manipulation of the shade or awning to control the dogs 10.

The links 21 are slotted. In each of the guides 1 below the lower end of the slot 18 a cross element 23 is provided, the same being rigidly connected with the side flanges of the guides. The cross elements 23 extend through the slots in the links 21 and function to uphold the links (Fig. 11) when disengaged from the cranks 17 and also function as catches for the links to permit disengagement of the cranks from the links. Each of these cross elements has on its upper side a shoulder 24. These shoulders 24 are in a plane between the plane of the slots 18 and the outer flange of the guides 1. From the shoulder 24 the upper edge 25 of each element 23 extends upwardly and outwardly to the outer flange of the guide, thus forming an inclined seat for the link 21 so that, when the link is disengaged from the crank 17, said link will always remain against the outer edge of the shoulder 24, thus holding the hook 22 in position for engagement with the crank 17 when the device is properly manipulated for that purpose. At the opposite side of the shoulder 24 the upper edge 26 of each cross element 23 intersects the wall of the shoulder in a plane below the plane of the edge 25 and curves upwardly and inwardly to the inner flange of the guide.

As the awning frame is movable vertically between the guides 1, there are shown washers 27 on the cranks 17 spacing the arms 16 from the guides 1. These washers are non-abrasive so that they will not mar the finish of the guides when the awning is operated.

In one form of the invention shown (Figs. 5 and 8) the ends of the arms 16 are extended beyond the cranks 17 and beyond the washers 27 for engagement upon projections 28 from the guides 1. These projections are in such relationship to the upper end walls of the slots 18 that, when the awning frame is extended approximately horizontally, as indicated by broken lines (Figs. 2 and 4), the ends of the arms 16 seat upon the upper side of the projections 28 and the cranks 17 abut against the upper end walls of the slots 18 and thus prevent the spring 6 from rotating the rod 5 to wind the shade or awning thereon. The construction may be varied by omitting the extended ends of the arms 16 and bending said arms laterally so as to extend through the slots 18 (Fig. 9) and securing a cross head 29 to the end of each arm 16 within the corresponding guide. One end of each cross head and each crank 17 is provided with a projection 30 for engagement with the hook 22 of the link 21. The opposite end of the cross head 29 is arranged to engage upon a projection 31 enclosed in the guide 1, said projection 31 being similar to the projections 28 and for similar functions, as described.

This device may be mounted in a door or window without detracting from the ornamental finish of the structure in which it is embodied. In the arrangement shown the guides 1 are on the inside of the panel 2 and the roller 5 is at such a distance from the panel 2 and the plane of the movement of said panel to and from closed position that there is no interference when the awning is not in use. When the awning is not in use the cranks 17 are engaged by the hooks 22. The arms 16 extend approximately vertically and the shade or awning 14 is wound around the roller 5. The parts are held under tension due to the fact that the springs 19 are under tension opposing the power of the roller spring 6. While the panel 2 is closed the device may be adjusted along the inside of the panel to function as a shade, as shown in Fig. 3. This adjustment is obtained by turning the awning frame inwardly and downwardly to the position shown. When the panel 2 is lowered the device may be extended outwardly to various positions to function as an awning. For instance, as shown by the broken lines in the upper part of Fig. 2, and as herein described, the ends of the arms 16 may be placed upon the projections 28 and the cranks 17 against the upper ends of the slots 18, thus positively holding the device extended outwardly as an awning. Or, the device may be adjusted to the position as shown in solid lines (Fig. 2) wherein the cranks 17 are at the lower ends of the slots 18 and the hooks 22 in engagement with said cranks 17, as shown in Fig. 10. Further, the device may be adjusted as shown in solid lines in Fig. 4 and broken lines at the lower part of Fig. 2, in which adjustment the hooks 22 still engage the cranks 17 and hold the awning frame under tension, the roller 5 being held by the dogs 10 from being operated by its spring 6 to wind the shade or awning on the roller. Movement of the awning frame from the position shown in broken lines at the bottom of Fig. 2 and solid lines in Fig. 4 to approximately vertical position, as in Fig. 11, causes the links 21 to abut against the shoulders 24, thereby holding said links from further movement by the cranks 17 and permitting the cranks to pass from engagement with said hooks so that the device may be adjusted as a shade or awning across the upper portion of the window or door panel 2, leaving the lower portion uncovered by the shade or awning. The device is capable of easy manipulation and operation and has a wide variety of adjustments and is of such strength and construction that it may not easily get out of order. The construction and relationship of the parts may be varied otherwise, and as herein specifically suggested, without departure from the nature and principle of the invention.

I do not restrict myself unessentially, but what I claim and desire to secure by Letters Patent is:—

1. An awning comprising a roller, a spring for turning said roller in one direction, a sheet of awning material having its free ends attached to said roller, a pair of spaced vertical slotted guides, a U-shaped frame having one end mounted for pivotal and sliding movements and having its intermediate portion connected with said sheet, and springs enclosed by said guides and connected at one end with said frame near the free ends thereof and at the opposite end to one of said guides and opposing the spring in said roller and having less spring power than the spring in said roller.

2. In the glass panel frame of an automobile, a slotted panel guide at each side of said frame, a spring-actuated roller supported by said guides, a sheet of awning material having one end attached to said roller, a U-shaped frame having its intermediate portion connected with the opposite end of said sheet of awning material and having its free ends connected with said guides for pivotal and sliding movements, and springs mounted in and connected at one end with said guides and having their opposite ends engaging said frame.

3. In the glass panel frame of an automobile, a slotted panel guide at each side of said frame, a spring-actuated roller supported by said guides, a sheet of awning material having one end attached to said roller, a U-shaped frame having its intermediate portion connected with the opposite end of said sheet of awning material and having its free ends connected with said guides for pivotal and sliding movements, springs mounted in and connected at one end with said guides and having their opposite ends engaging said frame, and means for disengaging said springs from said frame.

4. In a frame for a sliding glass panel, a slotted guide for said panel at each side of said frame, a spring-actuated roller supported by said guides, a sheet of awning material having one end attached to said roller, a U-shaped frame connected with the opposite end of said sheet and having pivotal and sliding connection with said guides, and means in connection with said guides for holding said frame firmly in an angular position with respect to said guides in opposition to said roller.

5. In a frame for a sliding glass panel, a slotted guide for said panel at each side of said frame, a spring-actuated roller supported by said guides, a sheet of awning material having one end attached to said roller, a U-shaped frame connected with the opposite end of said sheet and having pivotal and sliding connection with said guides, means in connection with said guides for holding said frame firmly in an angular position with respect to said guides in opposition to said roller, and spring elements enclosed by and each having one end engaging said guides and having their opposite ends arranged to engage said frame when said frame is moved to another position.

6. An awning of the character described comprising a spring-actuated roller, a sheet of awning material attached to said roller, means for holding said roller in different positions to which it is turned when said sheet is unwound from said roller, a U-shaped frame having its intermediate portion connected with the opposite end of said sheet and having its free ends mounted for pivotal and sliding movements, and springs each having one end connected with said frame and having their opposite ends held stationary, said spring cooperating with said frame to hold said sheet extended from said roller.

7. An awning of the character described comprising a spring-actuated roller, a sheet of awning material attached to said roller, means for holding said roller in different positions to which it is turned when said sheet is unwound from said roller, a U-shaped frame connected with the opposite end of said sheet, springs each having one end held stationary and having its opposite end connected with said frame, and elements in connection with said springs for engaging said frame to cooperate with said frame in holding said sheet extended from said roller.

8. An awning of the character described comprising a spring-actuated roller, a sheet of awning material attached to said roller, means for holding said roller in different positions to which it is turned when said sheet is unwound from said roller, a U-shaped frame connected with the opposite end of said sheet, springs each having one end held stationary and having its opposite end connected with said frame, elements in connection with said springs for engaging said frame to cooperate with said frame in holding said sheet extended from said roller and means for disengaging said elements from said frame.

9. An awning comprising a roller, a spring for turning said roller in one direction, releasable elements for holding said roller from being turned by said spring, a sheet of awning material having one end attached to said roller to roll on and unroll from said roller, a U-shaped frame attached to the opposite end of said sheet, pivot means for said frame, and springs each having one end held stationary and having their opposite ends connected with said pivot means and cooperating therewith and with said frame to hold the sheet of awning material extended.

10. An awning comprising a roller, a spring for turning said roller in one direction, releasable elements for holding said roller from being turned by said spring, a sheet of awning material having one end attached to said roller to roll on and unroll from said roller, a U-shaped frame attached to the opposite end of said sheet, pivot means for said frame, springs each having one end held stationary and having their opposite ends connected with said pivot means and cooperating therewith and with said frame to hold the sheet of awning material extended, and means for disconnecting said springs from said pivot means.

11. An awning comprising a roller, a spring for turning said roller in one direction, releasable elements for holding said roller from being turned by said spring, a sheet of awning material having one end attached to said roller to roll on and unroll from said roller, a U-shaped frame attached to the opposite end of said sheet, pivot means for said frame, springs each having one end held stationary and having their opposite ends connected with said pivot means and cooperating therewith and with said frame to hold the sheet of awning material extended, and means for disconnecting said springs from said pivot means and holding said springs in position for re-engagement with said pivot means.

12. An awning comprising a pair of spaced supports, a roller, a sheet of awning material having one end attached to said roller, a spring for turning said roller to wind said sheet around the roller and permitting said sheet to be unwound and extended from the roller, a U-shaped frame connected with the opposite end of said sheet, pivot elements for one end of said frame, and springs each having one end held stationary and having their opposite ends connected with said pivot elements and cooperating therewith to cause said frame to hold said sheet properly extended from said roller.

13. An awning comprising a pair of spaced supports, a roller, a sheet of awning material having one end attached to said roller, a spring for turning said roller to wind said sheet around the roller and permitting said sheet to be unwound and extended from the roller, a U-shaped frame connected with the opposite end of said sheet, pivot elements for one end of said frame, springs each having one end held stationary and having their opposite ends connected with said pivot elements and cooperating therewith to cause said frame to hold said sheet properly extended from said roller, and means for disconnecting said springs from said pivot elements.

14. An awning comprising a pair of spaced supports, a roller, a sheet of awning material having one end attached to said roller, a spring for turning said roller to wind said sheet around the roller and permitting said sheet to be unwound and extended from the roller, a U-shaped frame connected with the opposite end of said sheet, pivot elements for one end of said frame, springs each having one end held stationary and having their opposite ends connected with said pivot elements and cooperating therewith to cause said frame to hold said sheet properly extended from said roller, means for disconnecting said springs from said pivot elements, and abutments for cooperation with said frame to prevent said spring in said roller from turning said roller.

15. An awning of the character described comprising a roller, a sheet of awning material having one end attached to said roller, a spring in said roller for turning said roller in a direction to wind said sheet on said roller and permitting said sheet to be unwound and extended from said roller, a U-shaped frame having its intermediate portion attached to the opposite end of said sheet and having its free ends pivotally mounted, abutments cooperating with said frame to hold said frame in position to prevent said spring from operating said roller and to hold said sheet extended in an inclined position, and means for guiding said frame to and from engagement with said abutments.

CECIL G. HALE.